July 5, 1927.

R. RODRIGUEZ

SOUND AMPLIFYING INSTRUMENT

Filed Aug. 20, 1924    2 Sheets-Sheet 1

1,634,340

INVENTOR
Ramon Rodriguez
BY
ATTORNEYS

July 5, 1927.  
R. RODRIGUEZ  
1,634,340  
SOUND AMPLIFYING INSTRUMENT  
Filed Aug. 20, 1924  
2 Sheets-Sheet 2
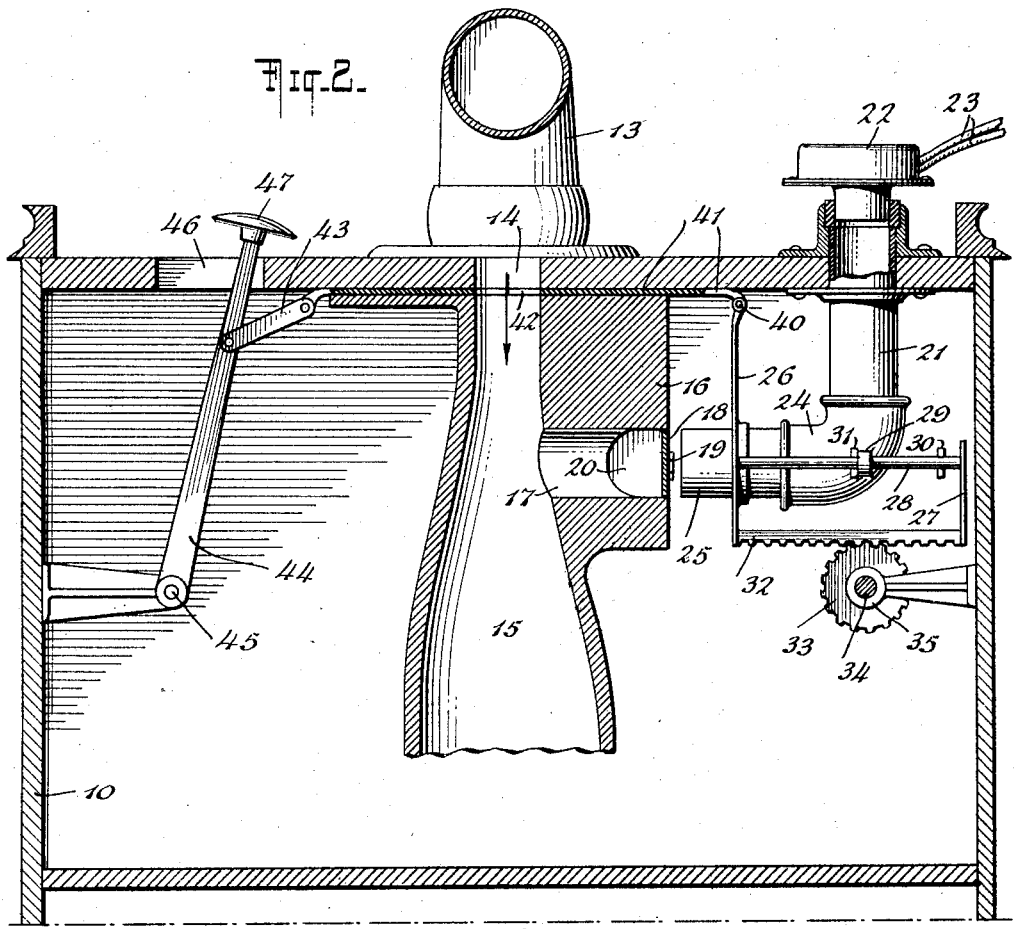
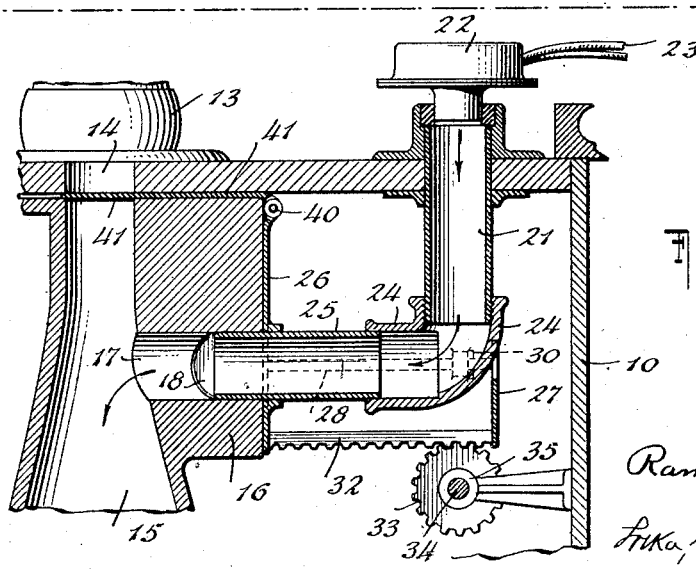
INVENTOR  
Ramon Rodriguez  
BY  
ATTORNEYS Patented July 5, 1927.

1,634,340

UNITED STATES PATENT OFFICE.

RAMON RODRIGUEZ, OF NEW YORK, N. Y.

SOUND-AMPLIFYING INSTRUMENT.

Application filed August 20, 1924. Serial No. 733,046.

My invention relates to sound amplifying instruments of the class commonly known as phonographs and has for its object to provide an efficient and novel construction whereby such instruments, in addition to reproducing the customary records, may be utilized for amplifying radio reception or in other words as a radio loud speaker. The invention contemplates also a simple arrangement whereby the instrument may be changed at will from a phonograph to a radio amplifier. Other more specific objects will appear from the description hereinafter and the features of novelty will be pointed out in the claims.

Figure 1:
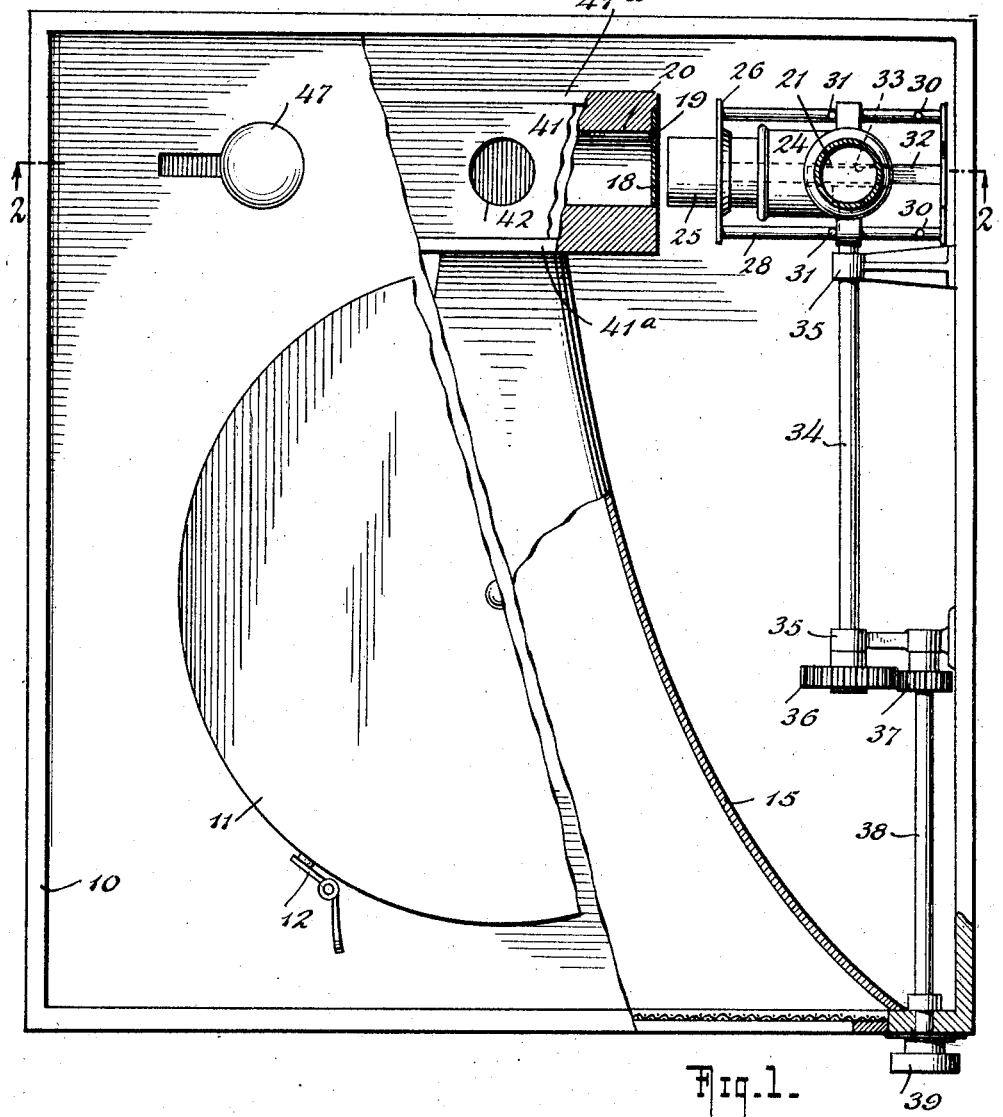
Figure 4:
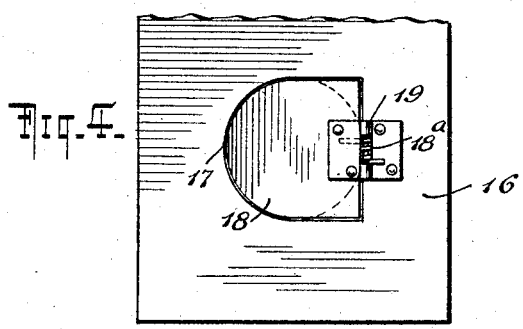

In the accompanying drawings, which illustrate an example of the invention without defining its limits, Fig. 1 is a plan view partly broken away, of an instrument including the novel features; Fig. 2 is a section on the line 2—2 of Fig. 1; Fig. 3 is a fragmentary section on the same line showing the parts in another position and Fig. 4 is a detail view of a shut-off device forming part of the arrangement.

The instrument comprises the customary casing 10 of suitable form and dimensions and including the usual rotatable record table 11 which when the instrument is used as a phonograph, is driven in the conventional manner by means of suitable driving mechanism; the latter has been omitted to avoid complication of the drawings and in practice will be arranged in the instrument in any well-known manner. A starting and stopping device 12 co-operating with the record table 11 to control the operation of the latter is located and operated in the conventional way; such other features as are commonly found in phonographs may also be included in the present construction. In addition, the instrument is provided with the customary tone-arm 13 adapted to carry the reproducer whereby a given record is reproduced, said tone-arm being mounted upon the casing 10 to swing across said record in the well-known way. The tone-arm 13 is located in registry with an opening 14 in the casing 10, said opening, in turn, being in communication with the customary amplifying horn 15 which, as shown in Fig. 1, is fixed within the casing 10, as usual, so as to open to the exterior of the instrument. The instrument and all of its parts as so far described may be of any recognized or special construction.

As shown in the drawings, the amplifying horn 15 is provided near its inlet end with a relatively thicker section 16 in which a branch passage 17 is located so as to have its inner end in connection with the interior of said amplifying horn 15. The outer end of said passage 17 is normally closed by means of a shut-off member or flap 18 hinged at 19 and automatically maintained in and returned to the closed position shown in Fig. 2, by means of a suitable spring 18$^a$; the member or flap 18 opens inwardly into the passage 17 against the tension of said spring 18$^a$ and in its fully open position is located within a recess 20, shown in Figs. 1 and 2, so as to lie flush with said passage 17. A tubular fixture 21 is secured in the casing 10 and has its outer end exposed and constructed to accommodate a radio loud speaker unit 22 of any conventional type, which is connected by wires 23 with the radio receiving apparatus in the usual way. The fixture 21 depends into said casing 10 and has its inner end 24 projecting toward and located in axial registry with the passage 17; a connecting tube 25 is slidably mounted in the inner end 24 of said fixture 21 and is adjustable to connect the latter with said passage 17 and to disconnect it therefrom. Any suitable mechanism, capable of being readily manipulated may be provided for operating the connecting tube 25; in the illustrated example the aforesaid mechanism comprises a rigid frame consisting of a plate 26 fixed upon the tube 25 and a companion plate 27 connected with the first plate by means of rods 28. The rigid frame, which constitutes a support for the connecting tube is slidable in the direction of the axis of said connecting tube 25, for instance, by slidably mounting the rods 28 in bearings 29 forming part of or secured to the end 24 of the fixture 21 as shown in Figs. 1 and 2; suitable stops 30 and 31 are provided upon the rods 28 to arrest the sliding movements thereof in opposite directions relatively to the bearings 29. The aforesaid frame carries a rack 32 arranged in mesh with a pinion 33 which is fixed upon a shaft 34; the latter is journalled in bearings 35 mounted in the casing 10 at the proper points and is provided with a second pinion 36, which meshes with a pinion 37 secured upon a companion shaft 38 journalled in one of the bearings 35 and in the front wall of the casing 10 as shown in Fig. 1. At its outer end the shaft 38 is provided with a knob or head 39 for facilitating the operation of the parts; in the form of the invention shown in the drawings the rack 32 with the frame on which it is mounted and the pinions 33, 36, 37, shafts 34, 38 and the knob 39 constitute the mechanism whereby the connecting tube 25 is operated, it being understood that such mechanism may vary in details and arrangement and even in operation without affecting the efficiency of the device.

As shown in Fig. 2 the plate 26 is extended upwardly and is pivotally connected at 40 with a control slide 41 mounted in a suitable guideway 41ª between the inlet end of the amplifying horn 15 and the opening 14 which is in communication with the tone-arm 13; the slide 41 is provided with an aperture 42 arranged to register with said opening 14 and the inlet end of the horn 15 when the parts are in the adjustment shown in Fig. 2 and to be out of registry therewith when the parts occupy the position shown in Fig. 3. The arrangement is such that the aperture 42 will register with the opening 14 and horn 15 when the connecting tube 25 is disconnected from the passage 17 and will be out of registry with said opening and horn when said tube 15 is connected with said passage 17. The control slide 41 thus prevents passage of sound backward through the tone-arm 13 when the instrument is functioning as a radio loud-speaker and is easily adjusted to open the communication between the tone-arm 13 and horn 15 when the instrument is used as a phonograph; while the slide 41 is a desirable feature of the invention it is not indispensable and in some cases may be omitted. As shown in the illustrated example the control slide 41 may further be connected, by means of a link 43, with a lever 44 pivoted at 45 in the casing 10 and extending upwardly through a slot 46 in the top wall thereof as shown in Fig. 2; a head or equivalent device 47 is fixed upon the projecting end of said lever 44 for manipulating the same. The lever 44 may be used as a substitute for the head 39 and its cooperating elements, for adjusting the slide 41 and the connecting tube 25; in some cases the connection 40 between the slide 41 and the plate 26 may be omitted so that the slide 41 may be adjusted by the lever 44 independently of the connecting tube 25 and the latter in such case may be adjusted independently of the slide. The latter, under such conditions, may also be used to regulate the volume of sound and to modify and modulate the same when the instrument is functioning as a phonograph. It will further be understood that the lever 44 may, if desired be omitted, in which case the actuation of the parts would be accomplished entirely through the medium of the head 39 and its associated elements of the equivalents thereof.

During the playing of the customary phonograph record, that is when the instrument is being used as a phonograph, the parts occupy the position shown in Fig. 1 in which the aperture 42 of the control slide 41 is in registry with the opening 14 and the communication between the tone-arm 13 and the amplifying horn 15 is consequently open. At the same time the connecting tube 25 is disconnected from the passage 17 so that the amplifying horn 15 is disconnected from the loud-speaker unit 22 and the shut-off member or device 18 is in its closed position so that escape of sound through said passage 17 is prevented.

When it is desired to utilize the instrument for amplifying radio reception, or in other words as a loud speaker, the knob 39 is rotated to the right in Fig. 1 whereby the shaft 38 and its pinion 37 are similarly actuated and the pinion 36, shaft 34 and pinion 33 are rotated in the opposite direction or toward the left in Fig. 1. This operation of the pinion 33 will shift the rack 32 to the left in Fig. 2 and consequently will move the connecting tube 25 into the passage 17 so that the latter is connected with the tubular fixture 21 and the amplifying horn 15 is accordingly brought into communication with the same and with the loud-speaker unit 22; it will of course be understood that the cooperating radio receiving apparatus has been or will, subsequently be adjusted to an operative condition. As the end of the connecting tube 25 comes into contact with the device or member 18 it will swing the same into the passage 17 against the tension of the spring 18ª until said device 18, in the final position of the connecting tube 25, reaches the recess 20 and thus lies flush with the passage 17 and presents no interference to the positioning of said connecting tube therein. At the same time the movement of the parts will be communicated, through the medium of the plate 26 and connection 40 to the control slide 41, which as a result will be shifted to the position shown in Fig. 3 in which the aperture 42 is out of registry with the opening 14 and communication between the tone-arm 13 and amplifying horn 15 is cut off; passage of sound backward into the tone-arm is consequently prevented. To disconnect the amplifying horn 15 from the radio and to restore the parts to the positions shown in Fig. 1 the knob 39 is rotated in the opposite direction, or toward the left in Fig. 1 which operates the pinions and shafts in a manner to shift the rack 32 toward the right in Fig. 2 and thereby withdraw the connecting tube 25 from the passage 17 and thus break the connection between the amplifying horn 15 and the fixture 21 and loud speaker unit 22; as the tube 25 is thus operated the member or device 18, by the action of the spring 18ª will be caused to follow the same until finally, as the disconnection is completed, said member will again occupy its closed position to close the outer end of said passage 17. Escape of sound through the latter is thereby again effectively prevented. As the described operations take place, the plate 26 will cause the control-slide 41 to be shifted back toward the right in Fig. 2, until the aperture 42 is again in registry with the opening 14 and the connection between the tone-arm 13 and horn 15 is again open. The movements of the elements in the manner set forth are arrested at the proper points by the respective engagement of the stops 30 and 31 with the bearings 29 from opposite directions. Instead of adjusting the parts by means of the head 39 and its cooperating elements, the same results may be obtained by swinging the lever 44 first to the left and then to the right in Fig. 2.

In any case the inlet end of the amplifying horn 15 and the exit end of the tone-arm 13 are in fixed registry with each other and the control slide or device 41 whereby communication between these elements is controlled is movable relatively to said tone-arm and horn. Similarly the inlet end of the branch passage 17 and the exit ends of the tubular fixture 21 and the stationary loud-speaker unit 22 are in fixed relation to each other and the connecting tube 25, whereby communication between said branch passage 17 and the loud speaker unit is controlled, is adjustable relatively to said tubular fixture 21 and horn 15. In the preferred arrangement the control slide or device 41 and the connecting tube 25 are concurrently operated in inverse relation by mechanism accessible from the exterior of the casing 10 so that when communication between the horn and tone arm is established the connection between the horn and the loud speaker will be broken.

The invention provides a simple and efficient mechanism whereby the amplifying properties of instruments of the indicated class may be utilized in connection with radio reception without interfering with the efficiency of the instrument as a phonograph. When connected and arranged as in the illustrated example the switching of the instrument from a phonograph to a radio loud speaker and vice versa is automatically accomplished without requiring independent operation of any of the parts. As previously set forth the connection between the slide 41 and the plate 26 may be omitted in which case the slide 41 and the connecting tube 25 may be independently manipulated. It is a recognized fact that present day phonographs constitute ideal instruments for amplifying radio reception and for presenting it in a natural manner and free from distortion. The present invention provides a simple and efficient mechanism whereby the indicated properties of such instruments are made easily available for radio purposes.

Various changes in the specific form shown and described may be made within the scope of the claims without departing from the spirit of the invention.

I claim:

1. The combination of a phonograph tone-arm, a radio loud speaker unit, an amplifying horn having a branch passage, the latter being arranged for connection with said radio loud speaker unit, controlling means whereby communication between said tone-arm and horn and between the branch passage of the latter and said loud speaker unit is established and disestablished in inverse relation, and independent means for automatically closing said branch passage when its communication with said loud speaker unit is disestablished.

2. The combination of a casing, a stationary amplifying horn therein provided with a branch passage, mechanism, including a tone-arm, mounted in said casing for reproducing phonograph records, the inlet end of the horn and the exit end of the tone-arm being in fixed registry with each other, a stationary tubular fixture in said casing for receiving a radio loud-speaker unit, a device adjustably mounted in said casing for controlling the connection between said tone-arm and horn, a connecting tube adjustably mounted in said casing and arranged to co-operate with said branch passage for controlling the connection between said horn and loud speaker unit and mechanism accessible from the exterior of the casing for manipulating said device and said connecting tube at will.

3. The combination of a casing, mechanism for reproducing phonograph records mounted therein, a tubular fixture secured upon said casing for receiving a radio loud speaker unit, an amplifying horn in said casing and a connecting tube adjustably mounted in said casing for connecting said horn with said unit and disconnecting it therefrom, a support for said tube slidably mounted on said tubular fixture and mechanism operatively connected with said support and accessible from the exterior of the casing for manipulating said connecting tube.

4. The combination of a casing, mechanism for reproducing phonograph records mounted therein, a tubular fixture secured upon said casing for receiving a radio loud speaker unit, an amplifying horn in said casing and a connecting tube adjustably mounted in said casing for connecting said horn with said unit and disconnecting it therefrom, a support for said tube slidably mounted on said tubular fixture, a rack carried by said support, a pinion meshing with said rack and operating means for actuating said pinion to manipulate said connecting tube.

5. The combination of a casing, mechanism for reproducing phonograph records mounted therein, a tubular fixture secured upon said casing for receiving a radio loud speaker unit, an amplifying horn in said casing and a connecting tube adjustably mounted in said casing for connecting said horn with said unit and disconnecting it therefrom, a support for said tube slidably mounted on said tubular fixture, a rack carried by said support, a pinion meshing with said rack, a shaft journalled in said casing and carrying said pinion, a second pinion mounted on said shaft, a third pinion meshing with said second pinion, a companion shaft journalled in said casing and extending exteriorly thereof and a head connected with said companion shaft for operating the same.

6. The combination of a casing, mechanism reproducing phonograph records mounted therein, a tubular fixture secured upon said casing for receiving a radio loud speaker unit, an amplifying horn in said casing and a connecting tube adjustably mounted in said casing for connecting said horn with said unit and disconnecting it therefrom, a support for said tube slidably mounted on said tubular fixture, a lever pivotally mounted in said casing and a connection from said lever to said support whereby said connecting tube is manipulated as said lever is operated.

7. The combination of a casing, mechanism for reproducing phonograph records mounted therein, a tubular fixture secured upon said casing for receiving a radio loud speaker unit, an amplifying horn in said casing and connecting tube adjustably mounted in said casing for connecting said horn with said unit and disconnecting it therefrom, a support for said tube slidably mounted on said tubular fixture, a rack carried by said support, a pinion meshing with said rack, a shaft journalled in said casing and carrying said pinion, a second pinion mounted on said shaft, a third pinion meshing with said second pinion, a companion shaft journalled in said casing and extending exteriorly thereof and a head connected with said companion shaft for operating the same, a lever pivotally mounted in said casing and a connection from said lever to said support whereby said connecting tube is manipulated as said lever is operated.

8. The combination of a casing, mechanism for reproducing phonograph records mounted therein, a tubular fixture secured upon said casing for receiving a radio loud speaker unit, an amplifying horn in said casing and a connecting tube adjustably mounted in said casing for connecting said horn with said unit and disconnecting it therefrom, a support for said tube slidably mounted on said tubular fixture and two individual operating mechanisms operatively connected with said support and both accessible from the exterior of said casing.

9. The combination of a casing, mechanism, including a tone-arm for reproducing phonograph records mounted in said casing, a stationary tubular fixture secured upon said casing for receiving a radio loud speaker unit, an amplifying horn in said casing having passages arranged for connection with said tone-arm and said tubular fixture respectively and bearing a fixed relation to the exit ends of said tone-arm and tubular fixture, a slide movable relatively to the horn and tone-arm for controlling the connection between said amplifying horn and the tone-arm, a connecting tube movable relatively to the horn and tubular fixture for controlling the connection between said amplifying horn and the tubular fixture and mechanism accessible from the exterior of the casing for simultaneously operating said slide and connecting tube to cut off the connection between the tone-arm and the horn and to establish communication between the latter and the tubular fixture and vice versa.

10. The combination of a casing, mechanism including a tone-arm for reproducing phonograph records mounted in said casing, a tubular fixture secured upon said casing for receiving a radio loud speaker unit, an amplifying horn in said casing common to said tone-arm and said tubular fixture, a slide for controlling the connection between said amplifying horn and the tone-arm, a connecting tube controlling the connection between said amplifying horn and the tubular fixture, a support for said tube slidably mounted on said tubular fixture, a connection between said slide and said support and mechanism accessible from the exterior of the casing for operating said support to simultaneously actuate said slide and said connecting tube in a manner to disconnect the amplifying tube from the tone-arm and connect it with the tubular fixture and vice versa.

11. The combination of a phonograph tone-arm, a radio loud speaker unit, an amplifying horn having a branch passage, the outer end of which is located in the wall of said horn, normally in disconnected relation with said radio loud speaker unit, controlling means whereby communication between said tone-arm and horn and between the branch passage of the latter and said loud speaker unit is established and disestablished in reverse relation, and an automatically acting flap member located in exposed position upon said wall of the horn for automatically closing said branch passage when its connection with said loud speaker unit is broken.

12. The combination of a phonograph tone-arm, a radio loud speaker unit, a tubular fixture leading therefrom, an amplifying horn having a branch passage terminating in spaced relation to said tubular fixture, controlling means whereby communication between said tone arm and horn is established and disestablished, controlling means whereby connection between opposed ends of said branch passage and tubular fixture is established and disestablished, means for operating said two controlling means in inverse relation to each other, and a swinging closure mounted in said branch passage for automatically closing the same when its connection with said tubular fixture is broken.

In testimony whereof I have signed this specification.

RAMON RODRIGUEZ.